C. A. MILLER.
VEHICLE SPRING.
APPLICATION FILED NOV. 8, 1916.

1,298,243.

Patented Mar. 25, 1919.

Inventor
Carl A. Miller
by
his Attorney.

UNITED STATES PATENT OFFICE.

CARL A. MILLER, OF LOS ANGELES, CALIFORNIA.

VEHICLE-SPRING.

1,298,243.  Specification of Letters Patent.  Patented Mar. 25, 1919.

Application filed November 8, 1916. Serial No. 130,108.

*To all whom it may concern:*

Be it known that I, CARL A. MILLER, a citizen of the United States, residing at Los Angeles, in the county of Los Angeles, State of California, have invented new and useful Improvements in Vehicle-Springs, of which the following is a specification.

This invention relates to improvements in and for that kind of vehicle spring which is the subject matter of my Patent No. 1,189,375, dated July 4, 1916; and the present improvements include certain improvements in the spring arrangements and structure, and certain other detailed improvements, as will hereinafter appear.

Aside from detailed improvement of structure, this present invention involves mainly an improvement embodying the use, in such a combination as described, of a combined compression and extension spring arrangement, to take the place of the simple extension spring shown in my former patent. Details of a specific embodiment and preferred form are explained in the following specification, reference being had to the accompanying drawings, in which, for the purpose of this specification, I have shown a preferred and specific form of spring embodying my present invention.

Figure 1:
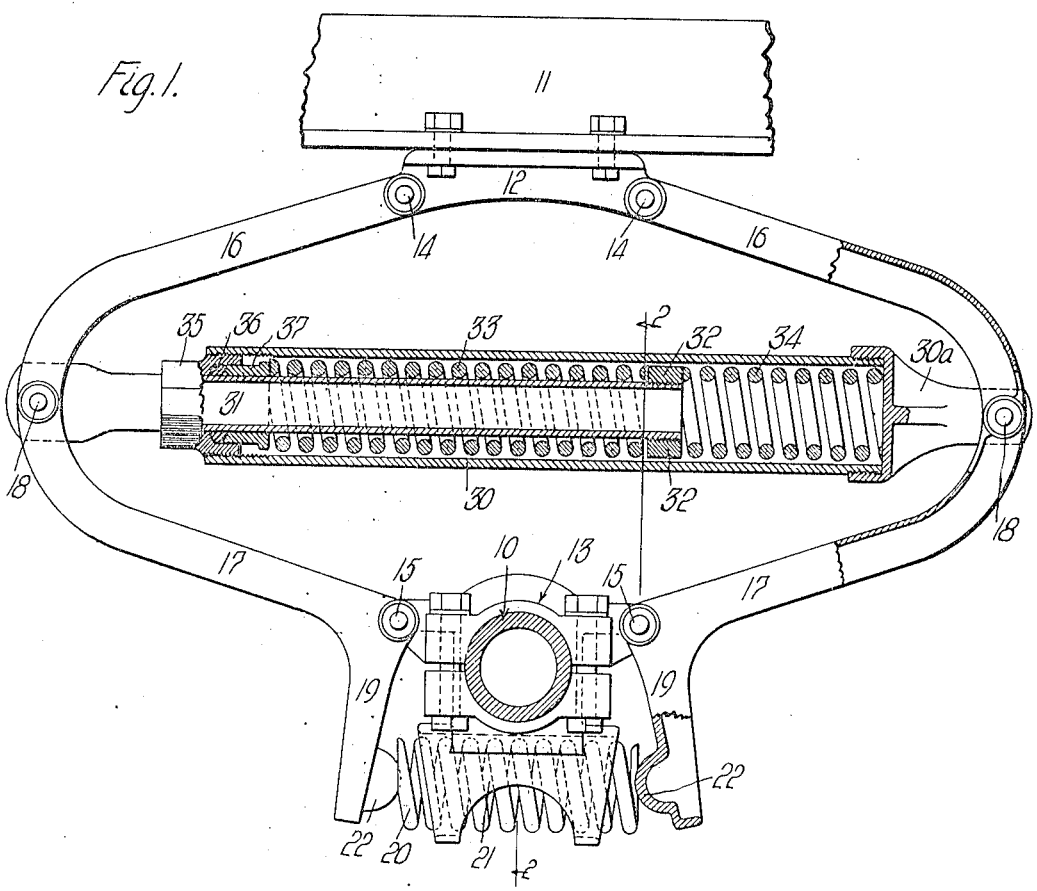
Figure 2:
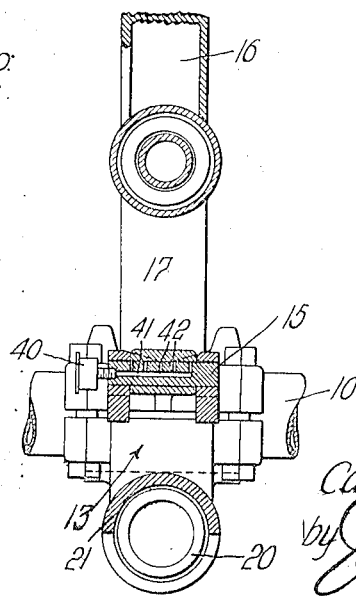

In these drawings Figure 1 is a side elevation illustrating the preferred form of spring, parts being shown in section for purposes of illustration; and Fig. 2 is a section taken on line 2—2 of Fig. 1.

In the drawings the numeral 10 designates a vehicle axle and 11 a vehicle frame. I mount a seat 12 upon the frame 11 and another seat 13 upon the axle 10. Seat 12 carries pivots 14 at each side; and seat 13 carries pivots 15 at each side, preferably directly under the pivots 14. Links 16 and 17 are pivotally mounted upon pivots 14 and 15, in pairs, arranged oppositely and symmetrically to each other, and the links of each pair being centrally, pivotally connected together at 18, as illustrated. These links are preferably channel-shaped, upper links 16 having their flanges extending inwardly and downwardly, while the lower links 17 have their flanges extending outwardly and downwardly, as illustrated in the drawings. Each of the lower links 17 has a downward extension 19, whose lower ends stand outside the two opposite ends of a coiled compression spring 20. Spring 20 is loosely held in a spring-supporting part or housing 21 mounted upon the seat 13. The extensions 19 have semi-spherical knobs 22 adapted to engage in the ends of the spring 20 when the extensions 19 are thrown toward each other by reason of the links 17 being thrown downwardly about their pivotal mountings 15. Ordinarily the extensions 19 do not engage the compression spring 20, but only engage after a certain amount of movement of links 17; spring 20 being in the nature of an auxiliary or bumper spring which comes into play only after a certain amount of movement of the links to stop or retard further downward movement of the vehicle frame.

I connect a special spring element between the pivots 18, tending normally to prevent their movement away from each other and tending normally to hold the links in the substantially diamond configuration illustrated, and thus supporting the vehicle frame 11. I provide a spring container in the form of a cylinder or tube 30, connected, through the medium of the head fitting 30ª at one end, directly to one of the pivots 18. A plunger 31, preferably hollow, is connected to the other pivot 18; and this plunger 31 extends within the tube or cylinder 30, and carries upon its inner end a head 32. This head 32 preferably does not fit tightly in the tube, and preferably normally stands closer to one end of the tube than to the other; allowing a comparatively long space for supporting spring 33 and a comparatively short space for rebound spring 34. However, the relative lengths of these springs may, of course, be modified. At the end of tube 30, where the plunger 31 enters, I provide a head bearing sleeve 35 provided with a packing gland 36 and a packing follower 27, upon which packing follower the spring 33 rests. The packing in the gland 36 makes a tight joint so that the springs within tube 30 may be operated in oil, and so that, if desired, the head 32 may act somewhat as a loose piston in the tube 30, compressing air or other fluid upon one side or the other, as it moves back and forth in the tube.

The supporting spring 33 is of such strength and resiliency as to properly resiliently support the vehicle frame and give the proper spring action; being comparatively long so as to give a comparatively long and free spring action. This long free spring action gives the vehicle frame an easy, smooth riding support, and also has the effect of keeping the vehicle wheels in close and intimate contact with the road surface. When I say that the spring 33 has a long and free action, I speak in terms comparing the action of spring 33 with that of spring 34; in fact, the actual resilient action of each of these springs is, measured in inches, very short; because, as will be readily seen, a long vertical movement of frame 11 will cause but slight increase in distance between the pivotal points 18. And herein lies one reason for the easy riding qualities of my spring; because a relatively large vertical movement of the vehicle frame causes but a comparatively small change in tension of the spring 33, or of the spring 34. This means that the movements of the vehicle 11 will not be quickly or abruptly retarded or checked unless the movement is excessive, and when the movement is excessive in a downward direction the buffer or auxiliary spring 20 comes into play; while, when the movement is excessive as in an upward direction, the comparatively short rebound spring 34 is more highly compressed and brings the movement to a stop.

The head sleeve 35 is made with nut faces on its outer end, and is screw threaded into the end of tube 30, so as to be somewhat adjustable in position to adjust the initial strain upon the springs 33 and 34. Among many other advantages of my spring, there is a specific advantage of being comparatively frictionless, the only substantial friction being at the pivotal points, 14, 18 and 15. The pivotal studs at these points may be very easily lubricated by providing grease cups 40 upon their ends, the lubricant being fed into longitudinal bores 41 and thence to transverse bores 42 to the bearing surfaces of the pivots.

Having described a preferred form of my invention, I claim:

A vehicle spring, embodying an upper and a lower seat adapted to be mounted on a vehicle frame and axle, respectively, two pairs of links connected to said seats, the links of each pair being pivotally connected together and being pivotally connected one to the upper seat and one to the lower seat, the four links normally lying in a substantially diamond configuration, a downward extension from the lower link of each pair, a compression spring carried by the lower seat and adapted to be engaged between the extensions after a certain amount of movement of the links, and a resilient element connected between the points of connection of the links to each other, embodying a spring containing tube connected at one end to one of said points, a plunger in the tube with its outer end connected to the other of said points, a head on the inner end of the plunger within the tube closer to the first mentioned end of the tube than to the other, heads for the tube one of which includes a packing gland surrounding the plunger and is adjustable in position in the tube, and two compression springs one long and one short confined between the plunger head and the tube heads.

In witness that I claim the foregoing I have hereunto subscribed my name this 31st day of October, 1916.

CARL A. MILLER.

Witnesses:
JAMES T. BARKELEW,
ELWOOD H. BARKELEW.